ated by the crank-shaft mechanism which
UNITED STATES PATENT OFFICE.

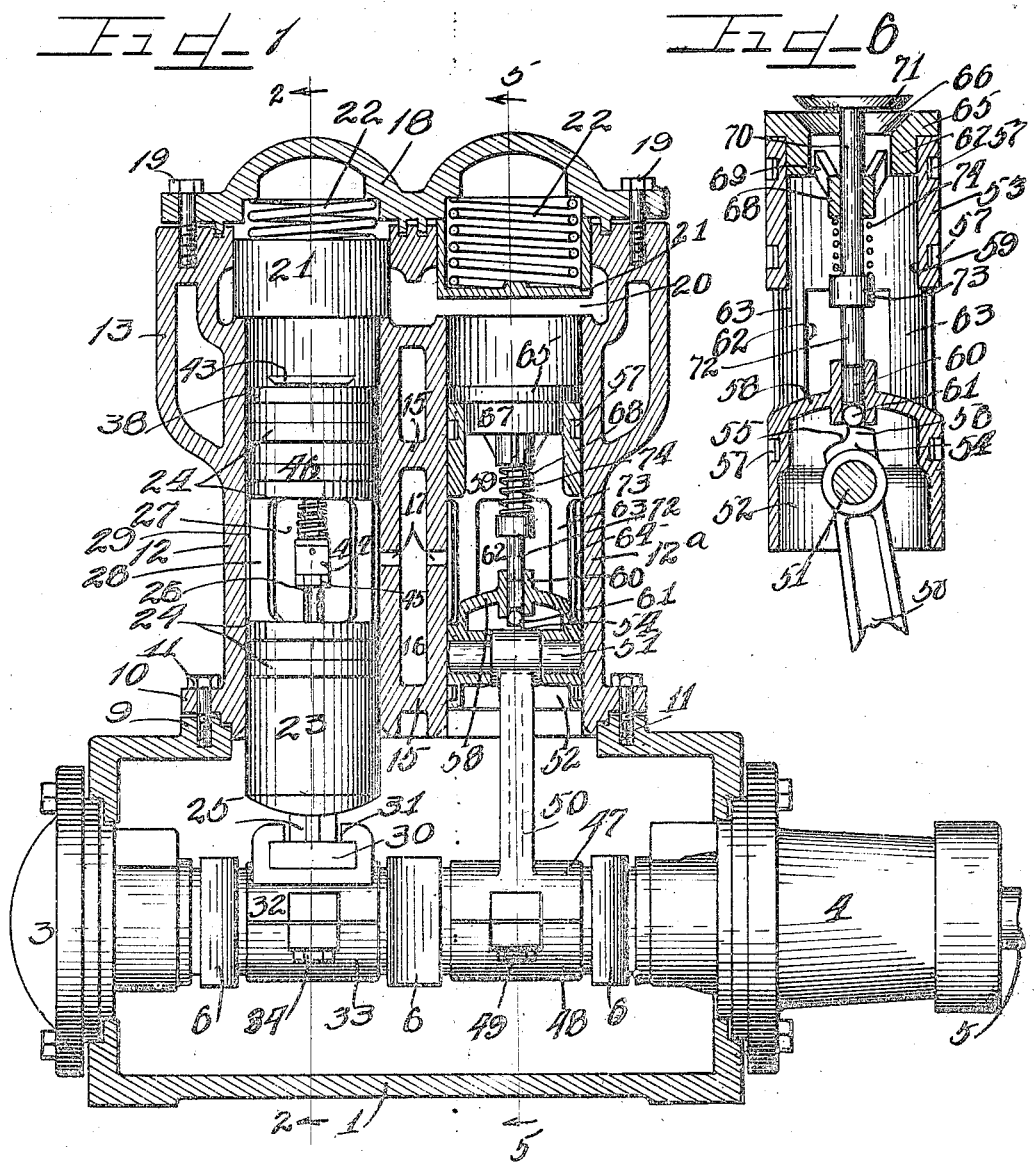

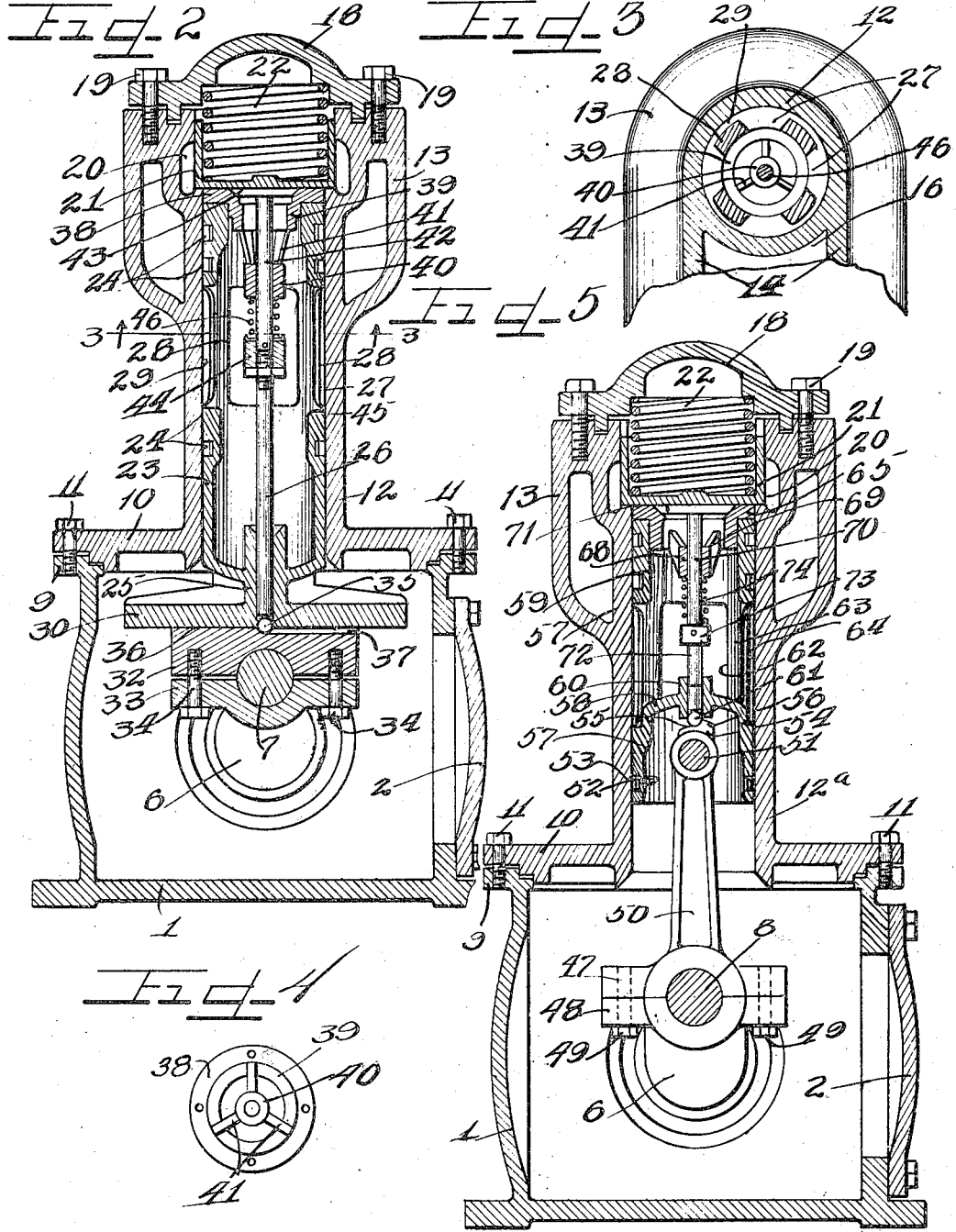

WILLIAM WISHART AND ALBERT H. MORRELL, OF CLINTON, IOWA, ASSIGNORS TO CLINTON REFRIGERATING COMPANY, OF CLINTON, IOWA, A CORPORATION OF IOWA.

COMPRESSOR VALVE MECHANISM.

1,398,309.  Specification of Letters Patent.  Patented Nov. 29, 1921.

Application filed September 8, 1919. Serial No. 322,383.

*To all whom it may concern:*

Be it known that we, WILLIAM WISHART and ALBERT H. MORRELL, citizens of the United States, and residents of the city of Clinton, in the county of Clinton and State of Iowa, have invented certain new and useful Improvements in a Compressor Valve Mechanism; and we do hereby declare that the following is a full, clear, and exact description of the same, reference being had to the accompanying drawings, and to the numerals of reference marked thereon, which form a part of this specification.

This invention relates more particularly to an improved type of compressor or vacuum system piston valve mechanism adapted to be automatically operated by the crank-shaft mechanism of a compressor to control the flow of a refrigerant or other fluid through the compressor or vacuum pump.

It is an object of this invention to provide a compressor piston valve mechanism adapted to be operated by the crank-shaft mechanism of the compressor.

Another object of the invention is the construction of a piston valve adapted to be opened during the inward or suction stroke of the piston by the crank-shaft mechanism which reciprocates the piston.

It is also an object of the invention to provide a piston with a spring controlled valve adapted to be opened during the inward stroke of the piston by the crank-shaft mechanism operating the piston, and furthermore adapted to be automatically closed by the spring during the outward or compression stroke of the piston.

A further object of this invention is the construction of a piston valve mechanism adapted to be opened during the in stroke of the piston by means of a bearing device disposed below the valve mechanism and rotated by the crank-shaft mechanism which reciprocates the piston.

It is furthermore an object of the invention to provide a piston mechanism operable by a crank-shaft mechanism which also acts to positively open the piston valve.

Still another object of the invention is the construction of a piston mechanism having a valve therein adapted to be operated by a bearing ball disposed between the valve and the crank-shaft which reciprocates the piston.

It is an important object of this invention to provide a compressor cylinder with a piston wherein a valve is mounted which is controlled directly by the crank-shaft which actuates the piston.

Other and further important objects of this invention will be apparent from the disclosures in the specification and drawings.

The invention (in a preferred form) is illustrated in the drawings, and hereinafter more fully described.

On the drawings:

Figure 1 is a central vertical longitudinal section partly in elevation, taken through a compressor having pistons equipped with crank-shaft operated piston valves embodying the principles of this invention.

Fig. 2 is a section taken on line 2—2, of Fig. 1, showing parts in elevation.

Fig. 3 is a fragmentary section taken on line 3—3, of Fig. 1.

Fig. 4 is a bottom plan view of the piston valve seat device removed from the upper end of the piston.

Fig. 5 is a section taken on line 5—5, of Fig. 1, with parts in elevation and showing a modified form of a piston and valve operable by a crank-shaft connecting-rod.

Fig. 6 is a vertical section of the modified piston showing the crank-shaft connecting-rod in position for opening the piston valve.

As shown on the drawings:

The reference numeral 1, indicates a crank case having an opening in the top, front wall and in each of the end walls. The opening in the front wall is closed by means of a removable cover plate 2. Removably secured to the respective end walls of the crank case are journal or bearing boxes 3 and 4, which serve to afford suitable bearings for rotatably supporting the crank-shaft 5. The crank-shaft is provided with cranks 6, between which crank-pins 7 and 8, are formed.

The top of the crank case 1, is provided with an apertured integral raised flange ring 9, around the top opening, to permit a flange or bottom plate 10, of a cylinder casting to be removably secured thereon by bolts 11, to close the top of the crank case. The cylinder casting comprises a pair of parallel vertical cylinders 12 and 12ª, open at both ends and provided with a water jacket 13, around the upper portions thereof. The two cylinders 12 and 12ª, are integrally connected by walls 14 and 15, which form a liquid or gas intake chamber 16, between said cylinders. The cylinder chambers communicate with the chamber 16, through inlet ports or slots 17, provided in the common walls separating the cylinder chambers from the chamber 16. The open cylinder casting is closed by a cover or top 18, which is removably secured to the top wall of the water jacket by bolts 19. An outlet chamber 20, is formed in the upper portion of the cylinder casting above the cylinders and is closed by the cover 18. The compressed gas or liquid forced into the chamber 20, is discharged through an outlet pipe (not shown), but connected to communicate with the outlet chamber. The upper end of each cylinder is closed by a slidable cup valve 21, normally held seated in position by a coiled spring 22, seated in the cup valve with the upper end held compressed against the cover 18.

Referring now to cylinder 12, of Fig. 1, and to Figs. 2, 3 and 4, a hollow piston 23, is mounted to reciprocate in the cylinder 12. Said piston 23, is closed at its lower end. A plurality of piston packing rings 24, are seated in grooves provided in the outer surface of the piston 23, to engage the inner walls of the cylinder 12, and form a fluid tight sliding joint. Integrally formed axially on the bottom of the piston 23, is a short passaged piston rod or guide sleeve 25, which extends upwardly into the piston to afford a guide for a lower valve stem 26. To permit a gas or liquid to be drawn from the chamber 16, through the ports 17, in the cylinder 12, and into the cylinder for compression, the piston 23, is provided with a plurality of intake openings or ports 27, intermediate the ends of the piston. The openings 27, in the piston are separated by connecting bars 28, which connect the upper and lower halves of the piston. The thickness of the bars 28, is less than that of the piston walls, and thereby afford passages 29, between the inner wall of the cylinder 12, and the bars 28. The openings 27, thus communicate with one another through the passages 29.

Formed integrally at right angles on the lower end of the short piston rod 25, is a horizontal plate or shoe 30, which is slidably engaged in a T-slot 31, formed in the upper portion of a top bearing box section 32. A bottom bearing box section 33, is removably secured to the bottom of the top bearing box section by bolts 34. Each of the bearing box sections 32 and 33, is provided with a rounded groove to permit the crank-pin 7, to be engaged in the bearing box to permit operation of the piston by the crank-shaft. A bearing ball 35, is disposed in the lower open end of the passaged piston rod 25, below the valve stem 26. Said bearing ball 35, is permitted to roll on the bottom 36, of the T-slot 31, during the inward stroke of the piston, and roll in a slot 37, formed in the upper bearing box section 32, when the piston is forced outwardly in the cylinder 12, to compress a gas or liquid in the cylinder chamber above the piston.

The piston valve mechanism for the piston 23, comprises a piston plate or disk 38, which is removably secured on the upper end of the piston 23, by screws or other suitable means, and is provided with a valve seat. A collar 39, is integrally formed on the bottom of the piston plate 38, and projects into the piston bore. A guide sleeve 40, is disposed within the piston and is rigidly connected to the piston plate collar 39, by a plurality of rods or bars 41. Slidably projecting through the piston plate 38, and through the guide sleeve 40, is an upper valve stem section 42, having a valve 43, formed on the upper end thereof to seat in the valve seat of said piston plate. The upper valve stem section 42, is connected to the upper end of the lower valve stem section 26, by an internally threaded connector 44, which is threaded on the threaded upper end of the stem section 26, and locked in place by a lock nut 45. The lower end of the upper valve stem section projects into the connector 44, and is secured thereto by means of a pin. A controlling spring 46, is disposed on the valve stem between the connector 44, and the guide sleeve 40, to afford a means for closing the piston valve 43, when the piston moves outwardly in the cylinder 12.

In the modified form of the device shown in the cylinder 12ª, of Fig. 1, and in Figs. 5 and 6, a top bearing box section 47, and a bottom bearing box section 48, are bolted together around the crank-pin 8, by means of bolts 49. Integrally formed on the top bearing box section 47, is a connecting-rod 50, the upper end of which is rotatably engaged on a piston-pin 51, formed transversely in an open bottom chamber 52, of a hollow piston 53, mounted to reciprocate in the cylinder 12ª. Integrally formed on the upper bearing end of the connecting-rod 50, above the piston-pin 51, is a valve controlling shoe 54, cut away at one corner to form a notch or recess 55, and also provide a projection 56, as shown in Fig. 6.

The piston 53, is provided with a plurality of circumferential grooves within which are seated packing rings 57, to engage the inner surface of the cylinder 12ª, and form a fluid tight sliding joint. An arched or curved partition wall 58, is integrally formed in the piston 53, and separates the lower piston chamber 52, from the upper or intake chamber 59, of the piston. A passaged guide sleeve 60, is integrally formed on the center of the piston partition 58, and projects into both of the piston chambers 52 and 59. A bearing ball 61, is disposed in the lower end of the sleeve passage and rests upon the connecting-rod shoe 54. The piston 53, above the partition 58, is provided with a plurality of intake openings or ports 62, to permit a liquid or gas to be drawn from the chamber 16, through the port 17, in the cylinder 12ª, and into the piston chamber 59. The intake openings 62, in the piston are separated by connecting bars 63, which connect the upper and lower portions of the piston. The thickness of the bars 63, is less than that of the piston walls, and thereby affords passages 64, between the inner wall of the cylinder 12ª, and the bars 63. The openings 62, thus communicate with one another through the passages 64.

The piston valve mechanism for the piston 53, comprises a piston plate or disk 65, which is removably secured on the upper open end of the piston, by screws or other suitable means, and is provided with a valve seat 66. A collar 67, is integrally formed on the bottom of the piston plate 65, and projects into the piston chamber 59. A guide sleeve 68, is disposed within the piston and is rigidly connected to the piston plate collar 67, by a plurality of rods or bars 69. Slidably projecting through the piston plate 65, and through the guide sleeve 68, is an upper valve stem section 70, having a valve 71, formed on the upper end thereof to seat in the valve seat 66. The upper valve stem section 70, is connected to the upper end of a lower valve stem section 72, by a coupling or connector 73. The lower end of the lower valve stem section 72, slidably projects into the piston guide sleeve 60, and rests on the bearing ball 61. A controlling spring 74, is disposed around the upper valve stem section 70, between the connector 73, and the guide sleeve 68, to afford a means for closing the piston valve 71, when the piston moves outwardly in the cylinder 12ª.

The operation is as follows:

Referring to the form of the device as shown in the cylinder 12, of Fig. 1 and in Fig. 2, liquid or gas is admitted into the intake chamber 16. When the compressor is operated by applying a drive to the crank-shaft 5, the crank-pin 7, serves to reciprocate the piston 23. Starting with the piston 23, at the end of its upward stroke, as shown in Fig. 2, the cylinder valve 21, is closed by the spring 22. With the rotation of the crank-shaft the crank-pin 7, is swung downwardly thereby causing the bearing box 32—33, to slide with respect to the piston shoe 30, whereby the piston 23, is pulled inwardly in the cylinder 12. With the inward movement of the piston, the bearing ball 35, is forced upward to roll on the floor 36, of the T-slot 31. This movement of the bearing ball automatically forces the piston valve stem 26—42, outwardly in the piston valve 43. As the piston moves inwardly a partial vacuum is formed in the cylinder above the piston and below the closed cylinder valve 21. The heated and expanded liquid or gas from the chamber 16, is admitted through the port 17, which is always open, and into the piston chamber through the openings 27, to fill the piston and the chamber thereabove with the liquid or gas.

At the end of the downward stroke of the piston the bearing ball 35, drops into the bearing box slot 37, whereupon the compressed controlling spring 46, acts automatically to close the piston valve 43. When the piston starts to move outwardly at the end of the down stroke, the piston valve is closed as described, and the fluid in the cylinder compression chamber above the piston is compressed until it reaches a degree of compression sufficient to overcome the resistance of the spring 22, and the pressure in the chamber 20, whereupon the valve 21, is raised and the contents of the cylinder is forced into the chamber 20, and out through any suitable outlet pipe.

In the modified form of the device as shown in Figs. 5 and 6, the operation is substantially the same as that already described, with the exception that the piston valve 71, is opened during the down stroke of the piston 53, by the connecting-rod shoe 54, the projection 56, of which acts to raise the bearing ball 61, as shown in Fig. 6, and thereby force the valve 71, open against the resistance of the spring 74, which is compressed. The valve stem 70—72, is guided by the guide sleeves 68 and 60. As the piston 53, at the end of the in stroke begins its outward stroke the bearing ball is permitted to drop into the notch 55, of the connecting-rod shoe, thereby allowing the spring 74, to automatically close the piston valve 71. The liquid or gas in the chamber above the piston 53, and below the closed cylinder valve 21, is compressed until the resistance of the cylinder valve spring 22, and the pressure in the chamber 20, is overcome, whereupon the valve 21, is forced open and the contents of the cylinder is pumped into the chamber 20, and out through a suitable outlet pipe communicating with the chamber 20.

In both forms of the device as shown and described it will be noted that the piston valve is controlled by the crank-shaft which actuates the bearing ball to elevate the same or permit the same to drop to alternately cause opening and closing of the piston valve with the in and out strokes of the piston.

We are aware that numerous details of construction may be varied through a wide range without departing from the principles of this invention, and we therefore do not purpose limiting the patent granted otherwise than necessitated by the prior art.

We claim as our invention:

1. The combination with a cylinder piston, of a valve seat member secured on the upper end thereof and projecting thereinto, an upper guide sleeve rigidly secured to the inner portion of said valve and seat member, a lower guide sleeve integrally formed on the piston, a valve, an upper valve stem secured to the valve and projecting through the upper guide sleeve, a lower valve stem slidable in the lower guide sleeve, means for connecting said upper valve stem to said lower valve stem, and a spring engaged around the upper valve stem and bearing against said means and against said upper guide sleeve to normally hold the valve seated in the valve seat member.

2. The combination with a crank-shaft, of a piston, a valve thereon, slidably interfitting members connecting the crank-shaft with the piston to cause the piston to reciprocate when the crank-shaft rotates, and a bearing member disposed between said interfitting members to operate the valve.

3. The combination with a piston, of a valve therein, a shoe formed on said piston, a crank-shaft, a bearing member thereon slidably engaged with said shoe, and means disposed between said shoe and bearing member for operating the piston valve when the crank-shaft is rotated to reciprocate the piston.

4. The combination with a piston, a valve therein, a sleeve integral with the piston, a crank-shaft, bearing means on said crank-shaft slidably connected with the piston, and a bearing member in said sleeve adapted to be actuated by the bearing means to cause operation of the piston valve when the crank-shaft is rotated to reciprocate the piston.

5. A compressor comprising a crank case, a crank-shaft journaled therein, connected cylinders mounted on the crank case, a removable cover therefor closing an outlet chamber at the upper portion of said cylinders, spring controlled cup and valves for closing the upper ends of the cylinders, a piston in each cylinder, a valve stem connected therewith and projecting from the cylinder, a shoe formed on the bottom of each piston, grooved bearing boxes engaged on the crank-shaft and slidably connected with said shoes to permit operation of the pistons by the crank-shaft, bearing balls in the bearing boxes below the valve stems, and piston valves in said pistons connected with the valve stems and adapted to be operated by the bearing balls when the crank-shaft is rotated.

In testimony whereof, we have hereunto subscribed our names in the presence of two subscribing witnesses.

WILLIAM WISHART.
ALBERT H. MORRELL.

Witnesses:
LeRoy D. Kiley,
Earl M. Hardine.